(12) United States Patent
Pahl

(10) Patent No.: US 6,513,343 B2
(45) Date of Patent: Feb. 4, 2003

(54) LIQUID CONTAINER AND DISPENSER

(76) Inventor: Bruce Pahl, 310 Jennifer La., Jordan, MN (US) 55352

( * ) Notice: Subject to any disclaimer, the term of this patent is extended or adjusted under 35 U.S.C. 154(b) by 0 days.

(21) Appl. No.: 09/969,400

(22) Filed: Oct. 2, 2001

(65) Prior Publication Data

US 2002/0040910 A1 Apr. 11, 2002

Related U.S. Application Data

(60) Provisional application No. 60/237,164, filed on Oct. 2, 2000.

(51) Int. Cl.[7] .................................................. F25D 3/08
(52) U.S. Cl. ..................... 62/457.3; 62/457.2; 62/457.4; 62/457.7; 62/371
(58) Field of Search .............................. 62/457.2, 457.3, 62/457.4, 457.7, 371

(56) References Cited

U.S. PATENT DOCUMENTS

| | | | |
|---|---|---|---|
| 3,766,975 A | * 10/1973 | Todd | 126/400 |
| 4,163,374 A | * 8/1979 | Moore et al. | 220/592.01 |
| 4,886,176 A | * 12/1989 | Steakley | 16/111.1 |
| 5,271,244 A | * 12/1993 | Staggs | 62/457.3 |
| 6,116,045 A | * 9/2000 | Hodosh et al. | 62/457.4 |
| 6,363,740 B1 | * 4/2002 | Hansen | 62/236 |

FOREIGN PATENT DOCUMENTS

JP       03045874 A   *  2/1991  .................. 62/457.3

* cited by examiner

Primary Examiner—William C. Doerrler
Assistant Examiner—Filip Zec
(74) Attorney, Agent, or Firm—William Flynn

(57) ABSTRACT

A portable and securable liquid holder and dispenser having an outer shell formed from a stiff material, the liner having a top defining an opening surrounded by a top edge, a liner sized to insertably fit within the outer shell, the liner further having a top lip and sides, the top lip extending outward from the sides, the lip further sized to abut the top of the outer shell when inserted therein to locate the liner, a cup sized to insertably fit within the liner, the cup having a flange formed around the top periphery thereof, the flange sized to abut the top surface of the liner when the cup is inserted therein, the cup further having a top seal extending upwardly from the flange, a cover sized to removably sealably attach to the cup, the cover having a mating seal formed thereon to mate with the top seal of the cup and an aperture formed therein, means for withdrawing liquid from the cup, the means for withdrawing liquid insertable through the aperture defined in the cover, and means for selectively attaching the liquid container to a stationary object.

18 Claims, 2 Drawing Sheets

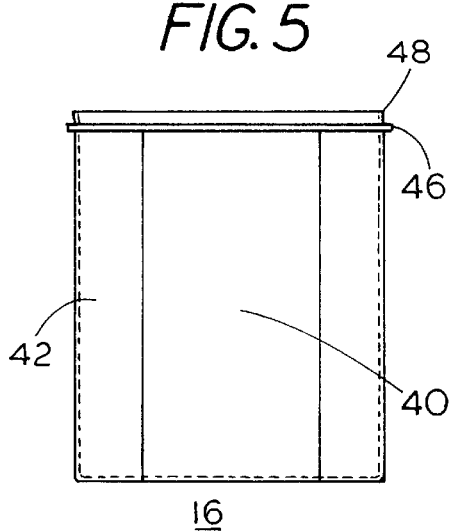
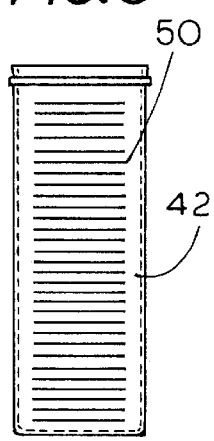
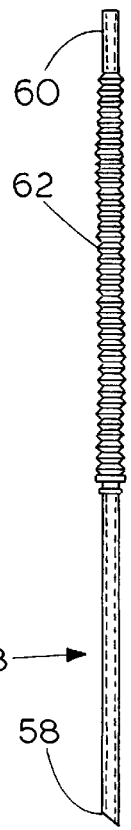
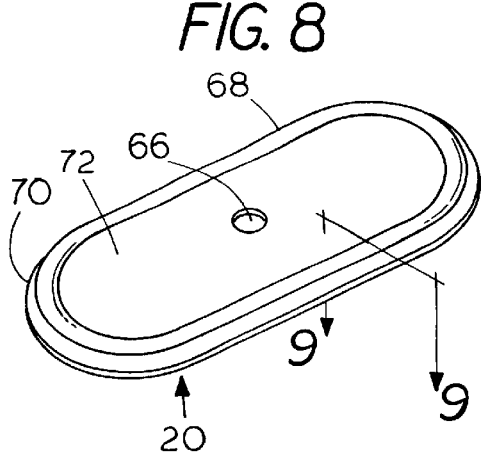
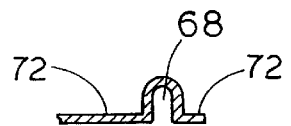

LIQUID CONTAINER AND DISPENSER

This application has a priority based on a previously filed Provisional Application Serial No. 60/237,164 filed Oct. 2, 2000.

BACKGROUND OF THE INVENTION

The device disclosed relates to a reusable liquid container, and more particularly, to a liquid container adapted for use by a physically challenged person or a person with limited mobility such as a person confined to bed.

Persons confined to a bed or wheelchair have previously been required to adapt to conventional liquid containers such as ordinary drinking glasses. When the person is ambulatory or nearly ambulatory, this has not been a problem, but, when the person has their movement severely limited due to a health condition or otherwise, it becomes difficult or impossible for the person to do such a simple task as to reach out and get a glass of liquid and drink the liquid. This difficulty becomes even more pronounced when the person is immobile for an extended period of time, or permanently.

The difficulty for a person to get a drink of water, unfortunately, may lead to the person becoming dehydrated much to the detriment of their health while obviating any improvement to their health that could have occurred. The problem of dehydration becomes more pronounced in the case of long term reduced functionality.

Conventional hospital care is to provide a patient with water or other liquids for drinking. However, the liquids are usually provided in pitcher with a glass. When the patient is able to sit or raise themselves to reach the glass and drink unassisted, there is not a problem, but, when the patient is unable to drink unassisted, visitors or staff are called on to assist the patient in drinking burdening either the visitors or the staff.

All too frequently, a patient has no visitors who are able to assist them with consuming the necessary liquids and the staff is either too busy or does not otherwise respond to the calls of the patient. When this occurs, the patient can soon become at risk of dehydration. Frequently, the this unfortunate occurrence happens to a patient who can least able to function with reduced liquids. A particular problem of the elderly and others is that they do not want to "impose" on the staff, and thus they are not able to receive sufficient liquids and can suffer dehydration therefrom.

What is needed is removable liquid container that can be selectively attached near a person to allow the person to drink liquids at the person's convenience. The liquid container should also be inexpensive and easy to use. The liquid container also should be sufficiently substantial to be usable for extended lengths of time.

SUMMARY OF THE INVENTION

The device disclosed herein is a reusable liquid container adapted to be detachably attached to a stationary object, such as a patient's bed or wheel chair. The liquid container or beverage dispenser is designed having a rigid outer container with a separable liner and a cup within the liner. A bendable pleated straw is inserted through a hole in the cover and into the liquid contained therein, allowing the user to withdraw the liquid at the user's convenience.

The outer shell of the beverage dispenser is adapted to be easily attached to a person's bed, wheel chair, or the like. The attachment may be by any suitable method, such as straps or the like. The inner liner of the beverage dispenser while fitting inside the outer shell may be somewhat smaller to allow the placement of insulation between the liner and the outer shell or a coolant such as ice in the space. Fitting within the liner is a cup that actually contains the liquid. The cup is covered with a sealed and removable cover with a drinking straw extending through the cover and into the liquid. The cup may be graduated so that the amount of liquid placed in the cup and therefore consumed can be monitored.

The straw may be fabricated overly long and simply cut to a suitable length, or may be made a standard length and extended when necessary by attachment of standard sized tubing. When the user is an invalid and unable to move, the drinking end of the straw can be clipped to a pillow on the bed or other location such that the user is able to reach the straw and drink the liquids at the convenience of the user.

BRIEF DESCRIPTION OF THE DRAWINGS

FIG. 5 is a side plan view of the cup of the beverage dispenser showing the flange and seal.

FIG. 6 is an end plan view of the cup of the beverage dispenser showing the optional graduation on the cup.

FIG. 7 is a plan view of the straw of the beverage dispenser showing the various parts of the straw.

FIG. 8 is a perspective view of the cover of the cup of the beverage dispenser.

FIG. 9 is a partial cross sectional view of the cover of the cup taken along line 9—9 of FIG. 8 showing the construction of the cover seal.

DESCRIPTION OF THE PREFERRED EMBODIMENT

Figure 1:
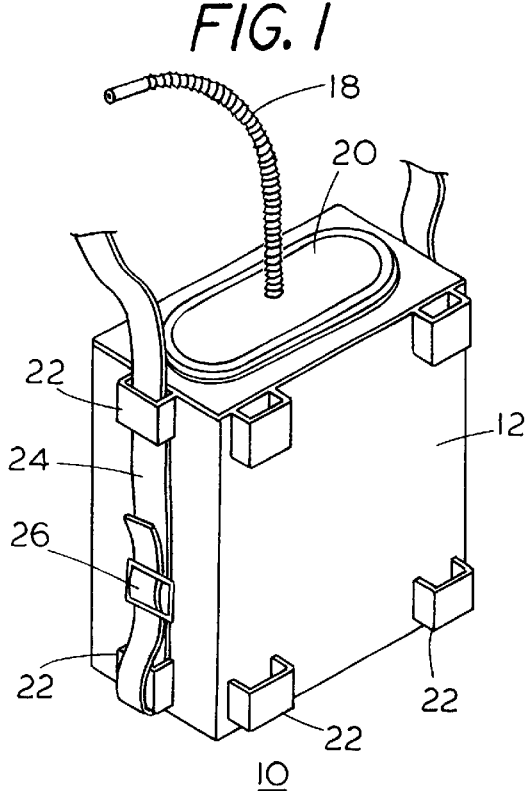
FIG. 1 is an overall perspective view of the beverage dispenser with attachment straps.
Figure 2:
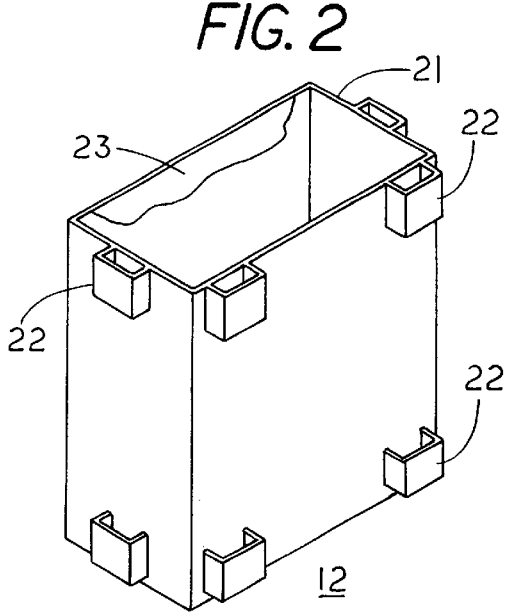
FIG. 2 is an overall perspective view of the outer shell of the beverage dispenser.
Figure 3:
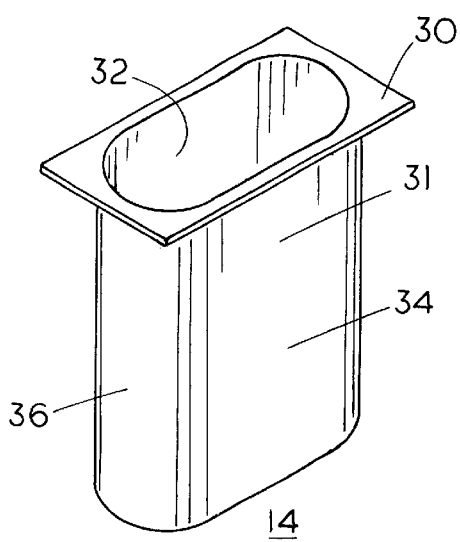
FIG. 3 is an overall perspective view of the liner of the beverage dispenser.
Figure 4:
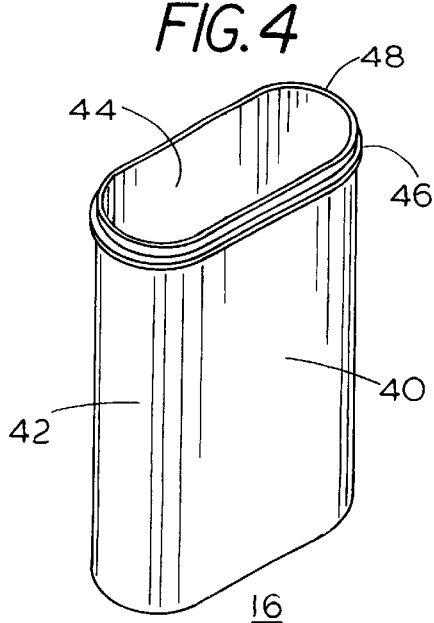
FIG. 4 is an overall perspective view of the cup of the beverage dispenser.

The beverage dispenser 10 has of an outer shell 12, a liner 14, a cup 16 a straw 18, and a cover 20. The outer shell 12 may be a substantially rectangular container with an open top 21 and several securement points 22 shown in the drawings as strap attachment loops. The outer shell 12 may be fabricated from any suitable material. Suitable materials include various polymers, or metal. The selection of materials for fabrication of the outer shell 12 is based primarily on the ease with which the material may be worked, for example, when the outer shell is fabricated from a polymer mater, the outer shell 12 may be fabricated in one step and in one piece. With the use of some polymers or metal, the outer shell 12 must be first fabricated and then the securement points 22 be attached to the outer shell 12 my means of adhesives or welding. Such fabrication increased the complexity and expense of producing the beverage dispenser 10.

The outer shell 12 should be sufficiently rigid to provide a stable base for attachment and to contain the liner 14 and the cup 16 and allow attachment to a convenient stationary object (not shown) to locate the beverage dispenser 10 conveniently for the user. The strap attachment loops 22 should be sufficiently strong so as to not break and to retain the beverage dispenser 10 in a selected location. The liner 14 has a substantially rectangular body 31 and an outwardly extending top flange 30. The liner 14 body 31 has a pair of planer parallel sides 34 connected by a pair of rounded ends 36 forming the container of the body 31.

The flange 30 of the liner 14 may be a planer extension of the top of the liner body 31 and extends approximately perpendicularly outward from the liner body 31. The periphery of the flange 30 may be sized to rest on and abut the top 21 of the outer shell 12 without unduly overlapping the top 21 of the outer shell 12.

The liner body 31 is preferably sized to fit within the outer shell 12. The sides 34 may be sized to fit snuggly within the outer shell 12 or the liner body 31 may be sized to fit within the outer shell 12 with the liner sides 34 spaced away from the interior of the outer shell 12.

The height of the liner body 31 must be less than the height of the outer shell 12 so that the liner 14 can be fitted within the outer shell 12. However, the height of the liner body 31 may be significantly less than the height of the outer shell 12 to provide a space between the bottom of the liner 14 and the bottom of the outer shell 12.

When the liner sides 34 are sized in a spaced apart relationship with respect to the interior of the outer shell 12, the space therebetween may be left empty to provide an amount of insulation, or may be selectively filled with an insulating material 23 such as an expanded polymer material or other insulation products. When the liner sided 34 are spaced apart from the interior of the outer shell 12 it is preferred that the bottom of the liner 14 also be spaced apart from the bottom of the outer shell 12 to provide a space for insulation. Such insulating products are well known in the art and available from numerous sources and will not be discussed. When so insulated, the beverage dispenser will keep cold liquids cold or hot liquids hot for an extended period of time.

Alternately, the interspace between the liner sides 34 and the outer shell 12 may be selectively filled with a cooling medium such as ice or ice water to retain the liquid at a lowered temperature for a longer time to increase the palatability of the liquid to the user. Preferably, in this embodiment, the bottom of the liner 14 is also spaced above the bottom of the outer shell 12 to allow placement and movement of the refrigerating medium around the entire liner 14.

The liner 14 may be constructed from any suitable material such as a polymer or metal material. When constructed from a polymer material, the liner 14 may be somewhat flexible as the liner 14 need not withstand any substantial forces. It is preferred that the liner 14 be constructed from a polymer material owing to the ease of fabrication, that is, the liner 14 can be formed in a single molding process.

The cup 16 has a body 41 preferably having planer sides 40, rounded ends 42, a retaining lip 46, and a top seal 48. The body 41 may be sized to fit closely within the liner 14 with the planer sides 40 disposed adjacent the liner sides 34 and the cup rounded ends 42 preferably are disposed adjacent the liner rounded ends 36. The cup 16 may also have graduations 50 formed or printed on one or both of the rounded ends 42. The graduations allow the monitoring of the quantity of liquids that are provided to the user, and, therefore the quantity of liquid that the user consumes. It is preferred that the graduations 50 be dual measuring in both English measurements, that is, fluid ounces, and in metric measurements.

While the cup 16 may be sized to fit closely within the liner, the height of the cup need not the same as the height of the liner 14. In some applications, it is preferable that the cup 16 be shorter than the liner 14 to provide a cup with a smaller liquid capacity when desired.

The cup 16 also may have a flange 46 extending outwardly from the periphery of the body 41. The flange 46 can serve the dual purposes of locating the cup 16 in the liner 14 and preventing a shorter cup 16 from sliding totally within the liner 14 and becoming inaccessible. Secondly, the flange 46 can retain the cover 20 in a closed position preventing the over application of the cover 20. Additionally, the space between the flange 46 and the cover 20 can be used to receive a tool to assist in the removal of the cover 20.

The cover 20 is desirably substantially planer in shape and has a straw aperture 66 formed centrally therein. The cover 20 preferably has a seal 68 formed proximate the periphery of the cover 20. The seal shown is formed as a "U" shaped depression sized to deformably receive the top seal 48 of the cup 16. When the seal 68 is engaged with the top seal 48 of the cup 16, a liquid tight seal is desirably formed. The interference fit of the seal 68 with the top seal 48 allows the placement or removal of the cover 20 on the cup 16.

Both the cup 16 and the cover 20 may be formed from any suitable material such as a polymer of metal, however, as both the cup 16 and the cover 20 may be in contact with consumable food products, the material must be food safe and should be preferably somewhat acid resistant as it is anticipated that some of the liquids that will be contained in the cup 16 will be fruit juices, such as orange juice, which are somewhat acidic. The cup 16 may be constructed from a material having suitable strength and longevity to allow reuse, or the cup 16 may be constructed of a material designed to be disposable after a single use.

The straw 18 is an elongate tube terminating in a bottom tip 58. The lower, or first section 59 of the straw is simply an elongate tube that extends through the straw aperture 66 of the cover 20 and allows the straw first section 59 to extend downwardly and terminate proximate the bottom of the cup 16. The bottom tip 58 of the straw 18 may be beveled to prevent the bottom tip 58 from engaging the bottom of the cup 16 inhibiting or preventing the flow of liquids.

The second section of the straw 18 is a pleated section 62 which is joined above the first section 59. The pleated section 62 provides the dual function of limiting the incursion of the straw 18 through the straw aperture 66 to locate the straw tip 58 proximate the bottom of the cup 16 and allowing the straw to be bent without collapsing.

The third, or top section 60 of the straw is an elongate tube joined to and extending from the pleated section 62. The top section 60 is an extension which, may be fabricated having excess length so that the top section 60 may be simply cut to the length desired by a user, or in a shorter length, adapted to accept an extension, such as standard sized tubing.

In its us, an beverage dispenser 10 is selected and is first located and attached to a stationary object, such as the user's bed or wheel chair. The beverage dispenser 10 as shown in FIG. 1 is designed to be attached using straps 24 with buckles 26 such that attachment would be accomplished by passing each strap 24 about a part of the stationary object and tightening the respective strap buckles 26. It is understood that the straps 24 shown are only illustrative and the straps 24 may be elastic thus obviating the need for buckles, or the buckles 26 may be replaced with hook and loop type fasteners, or any other known or unknown means to selectively define the length of the strap 24.

Once the beverage dispenser 10 is attached, the cup 16 may be filled with a quantity of a selected liquid. When the beverage dispenser 10 in use provides for the use of ice or other coolant, the ice or other coolant may optionally be inserted in the interspace between the outer shell 12 and the liner 14.

Thus filled with liquid and attached, the cover 20 is placed on the cup 16 and the straw 18 inserted through the straw aperture 66. The straw top section 60 is then manipulated, and cut to length when necessary to place the straw top section 60 at a location convenient to the user. When necessary, extension tubes (not shown) may be attached to the top section 60. Placement of the straw top section 60 may include affixing the top section 60 proximate the user, particularly, when the user has limited mobility.

When thus placed, the user may at their convenience, drink from the straw and consume the liquid contained in the cup 16 without the assistance of other persons increasing the independence of the user and freeing staff to perform other tasks.

Although the present invention has been described with reference to preferred embodiments, workers skilled in the art will recognize changes may be made in form and detail without departing from the spirit and scope of the invention.

What is claimed:

1. A portable and securable liquid holder and dispenser comprising:
   a. an outer shell formed from a stiff material, the liner having a top defining an opening surrounded by a top edge;
   b. A liner sized to insertably fit within the outer shell, the liner further having a top lip and sides, the top lip extending outward from the sides, the lip further sized to abut the top of the outer shell when inserted therein to locate the liner;
   c. a cup sized to insertably fit within the liner, the cup having a flange formed around the top periphery thereof, the flange sized to abut the top surface of the liner when the cup is inserted therein, the cup further having a top seal extending upwardly from the flange;
   d. a cover sized to removably sealably attach to the cup, the cover having a mating seal formed thereon to mate with the top seal of the cup and an aperture formed therein;
   e. means for withdrawing liquid from the cup, the means for withdrawing liquid insertable through the aperture defined in the cover; and
   f. means for selectively attaching the liquid container to a stationary object.

2. The liquid holder as described in claim 1 wherein the outer shell is formed from a rigid polymer material.

3. The liquid holder as described in claim 1 wherein the liner sides fit adjacent the inner periphery of the outer shell.

4. The liquid holder as described in claim 1 wherein the liner sides fit spaced apart from inner periphery of the outer shell.

5. The liquid holder as described in claim 4 wherein the space between the liner and the outer shell is filled with an insulating material.

6. The liquid holder as described in claim 4 wherein the space between the liner and the outer shell is filled with a refrigerant.

7. The liquid holder as described in claim 6 wherein the refrigerant is frozen water.

8. The liquid holder as described in claim 1 wherein a pair of the opposing liner sides are rounded.

9. The liquid holder as described in claim 1 wherein the cup is substantially the same height as the interior of the liner.

10. The liquid holder as described in claim 1 wherein the cup has substantially less height than the interior of the liner.

11. The liquid holder as described in claim 1 wherein the cover seal is a deformable "U" shaped ridge upwardly extending from the surface of the cover proximate the periphery of the cover.

12. The liquid holder as described in claim 1 wherein the means for withdrawing the liquid is an elongate tube.

13. The liquid holder as described in claim 12 wherein the elongate tube further comprises a central pleated bendable section.

14. The liquid holder as described in claim 1 wherein the means for selective attachment comprises a multiplicity of strap securing loops formed on the periphery of the outer shell and a plurality of straps.

15. The liquid holder as described in claim 14 wherein each of the plurality of straps further comprises means for selectively setting the length of the strap.

16. The liquid holder as described in claim 15 wherein the means for selectively setting the length of the strap comprises a buckle.

17. The liquid holder as described in claim 15 wherein the means for selectively setting the length comprises mating hook and loop fasteners.

18. A combination liquid container and dispenser selectably attachable to a stationary object comprising:
   a. an outer shell formed from a rigid material approximately rectangular in shape with an open top, the outer shell having a multiplicity of securement points formed upon the periphery of the shell, each of the securement points adapted for selectable attachment to the stationary object;
   b. a liner sized for insertion into the outer shell, the liner having a top flange and a body, the flange being substantially planer and extending outwardly from a first end of the body, the flange outer periphery being sized to rest on and abut the open the open top of the outer shell to selectively retain the liner within the outer shell, the body being approximately rectangular in shape having parallel sides, rounded ends, and a bottom parallel to the flange, the body further being sized to fit within the outer shell in a spaced apart relationship with the outer shell;
   c. a cup sized for insertion into the liner, the cup being approximately rectangular in shape having a top, a bottom, sides, and ends, the cup further being cross sectionally shaped to slidingly fit within the open top of the liner and adjacent the sides of the liner, an annular flange formed on and extending outwardly from the periphery of the cup proximate the top of the cup, the cup further having graduations to indicate the volume of liquid contained therein;
   d. a cover adapted to seal to the cup, the cover being substantially planer and having a central aperture formed therein, the cover further having an upwardly extending "U" shaped seal formed proximate the periphery of the cover, the seal being located and sized to releasably mate with and accept the top of the cup;
   e. an elongate liquid withdrawal apparatus, approximately circular in cross section having an elongate first section, a pleated second section, and an elongate third section, the first section having a length slightly less than the height of the cup, the second pleated section being attached to the first section and being non-collapsably bendable, the third section being attached to the second section and elongate;

f. at least one elongate strap insertable through at least on securement point of the outer shell, each of the straps having an adjustment mechanism formed thereon, the adjustment allowing the selectable lengthening and securing of the strap abut the stationary object.

* * * * *